United States Patent
Ting et al.

(10) Patent No.: US 9,141,149 B2
(45) Date of Patent: Sep. 22, 2015

(54) TOUCH PANEL ASSEMBLY

(71) Applicant: HON HAI PRECISION INDUSTRY CO., LTD., New Taipei (TW)

(72) Inventors: Chia-Wei Ting, New Taipei (TW); Hao-Ting Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/141,762

(22) Filed: Dec. 27, 2013

(65) Prior Publication Data

US 2014/0211391 A1    Jul. 31, 2014

(51) Int. Cl.
*G06F 1/16*    (2006.01)

(52) U.S. Cl.
CPC .............. *G06F 1/1692* (2013.01); *G06F 1/169* (2013.01); *G06F 1/1656* (2013.01)

(58) Field of Classification Search
CPC ... G06F 1/1633; G06F 1/1662; G06F 1/1684; G06F 1/1692
USPC ............. 361/679.02, 679.18, 679.4; 345/157, 345/168, 173
See application file for complete search history.

(56) References Cited

U.S. PATENT DOCUMENTS

| Patent | | Date | Inventor | Page |
|---|---|---|---|---|
| 5,546,334 A | * | 8/1996 | Hsieh et al. | 708/141 |
| 5,793,355 A | * | 8/1998 | Youens | 345/157 |
| 5,995,082 A | * | 11/1999 | Lakoski | 345/168 |
| 6,025,986 A | * | 2/2000 | Sternglass et al. | 361/679.08 |
| 6,219,038 B1 | * | 4/2001 | Cho | 345/173 |
| 6,262,716 B1 | * | 7/2001 | Raasch | 345/168 |
| 6,281,887 B1 | * | 8/2001 | Wang | 345/173 |
| 6,388,660 B1 | * | 5/2002 | Manser et al. | 345/173 |
| 7,068,499 B2 | * | 6/2006 | Aisenberg | 361/679.56 |
| 7,294,805 B2 | * | 11/2007 | Luo et al. | 200/500 |
| 7,486,278 B2 | * | 2/2009 | Sun | 345/173 |
| 7,602,604 B2 | * | 10/2009 | Shiroishi et al. | 361/679.45 |
| 8,564,938 B2 | * | 10/2013 | Horii et al. | 361/679.01 |
| 9,003,315 B2 | * | 4/2015 | Behar et al. | 715/764 |
| 2006/0201792 A1 | * | 9/2006 | Sun | 200/5 A |
| 2007/0144885 A1 | * | 6/2007 | Nakatani et al. | 200/520 |
| 2008/0239641 A1 | * | 10/2008 | Sato et al. | 361/681 |
| 2009/0009939 A1 | * | 1/2009 | Nakajima et al. | 361/680 |
| 2009/0304241 A1 | * | 12/2009 | Shigenobu et al. | 382/124 |

* cited by examiner

*Primary Examiner* — Anthony Haughton

(74) *Attorney, Agent, or Firm* — Novak Druce Connolly Bove + Quigg LLP

(57) ABSTRACT

A touch panel assembly includes an enclosure, a touch panel, and a soft board. The enclosure includes a bottom portion. The bottom portion defines a first surface and a second surface. The enclosure further includes a first hook and a first positioning post extending from the first surface. The touch panel is attached on the second surface. The soft board defines a first securing hole and a first positioning hole. The first positioning post is received in the first positioning hole to prevent the soft board from moving along a first direction. The soft board is deformed by an external force to enable the first hook to pass through the first securing hole to engage with an edge of the first securing hole, thereby preventing the soft board from moving a second direction substantially perpendicular to the first direction.

17 Claims, 6 Drawing Sheets

TOUCH PANEL ASSEMBLY

BACKGROUND

1. Technical Field

The present disclosure generally relates to a touch panel assembly.

2. Description of Related Art

A notebook computer usually includes a touch panel assembly. The touch panel assembly includes an enclosure, a touch panel, and a soft board electronically connected to the touch panel. The soft board is attached to the touch panel via glue. However, the soft board may be detached from the touch panel after the touch assembly is used for a long time.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
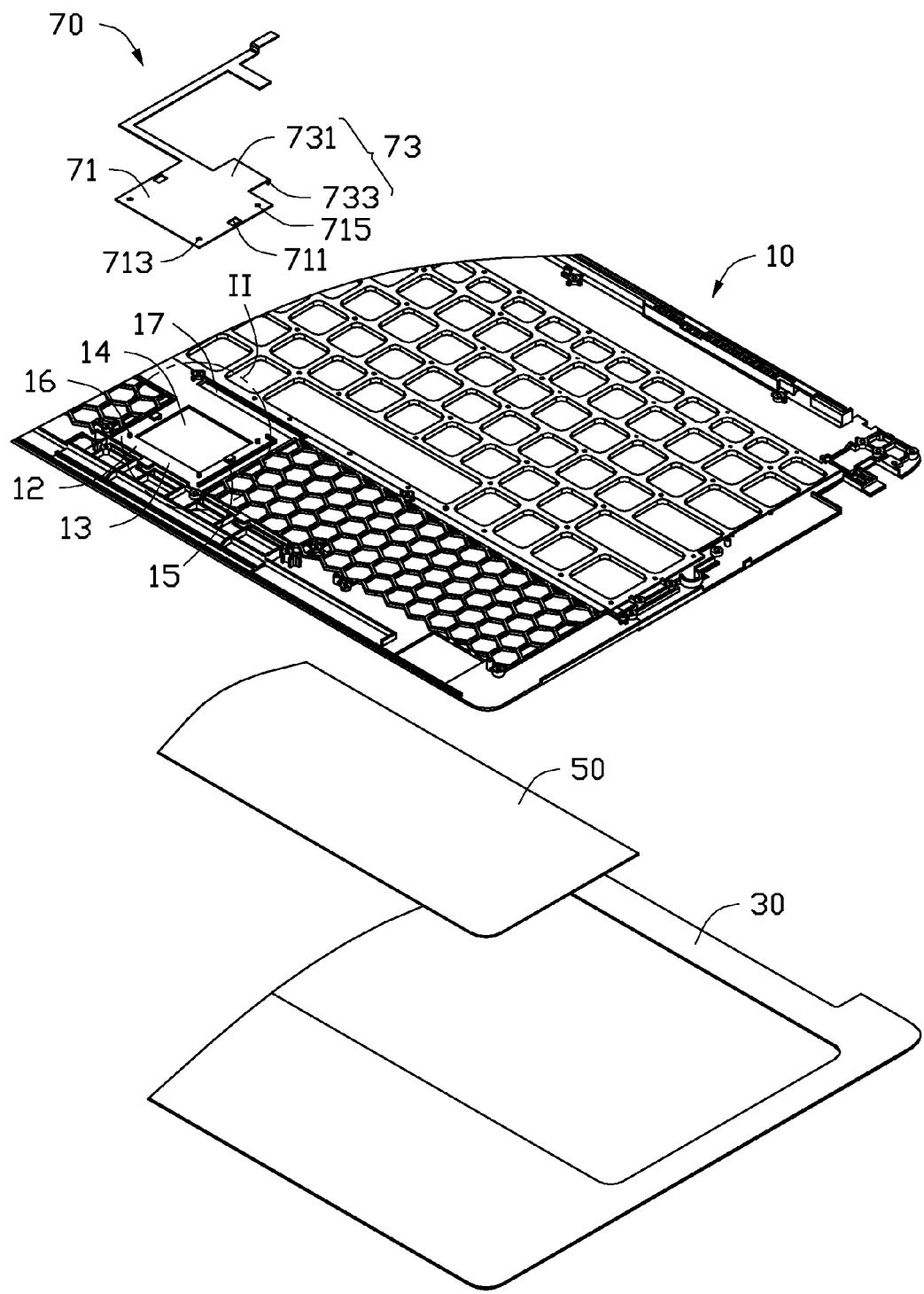
FIG. 1 is an exploded, isometric view of one embodiment of a touch panel assembly.
Figure 2:
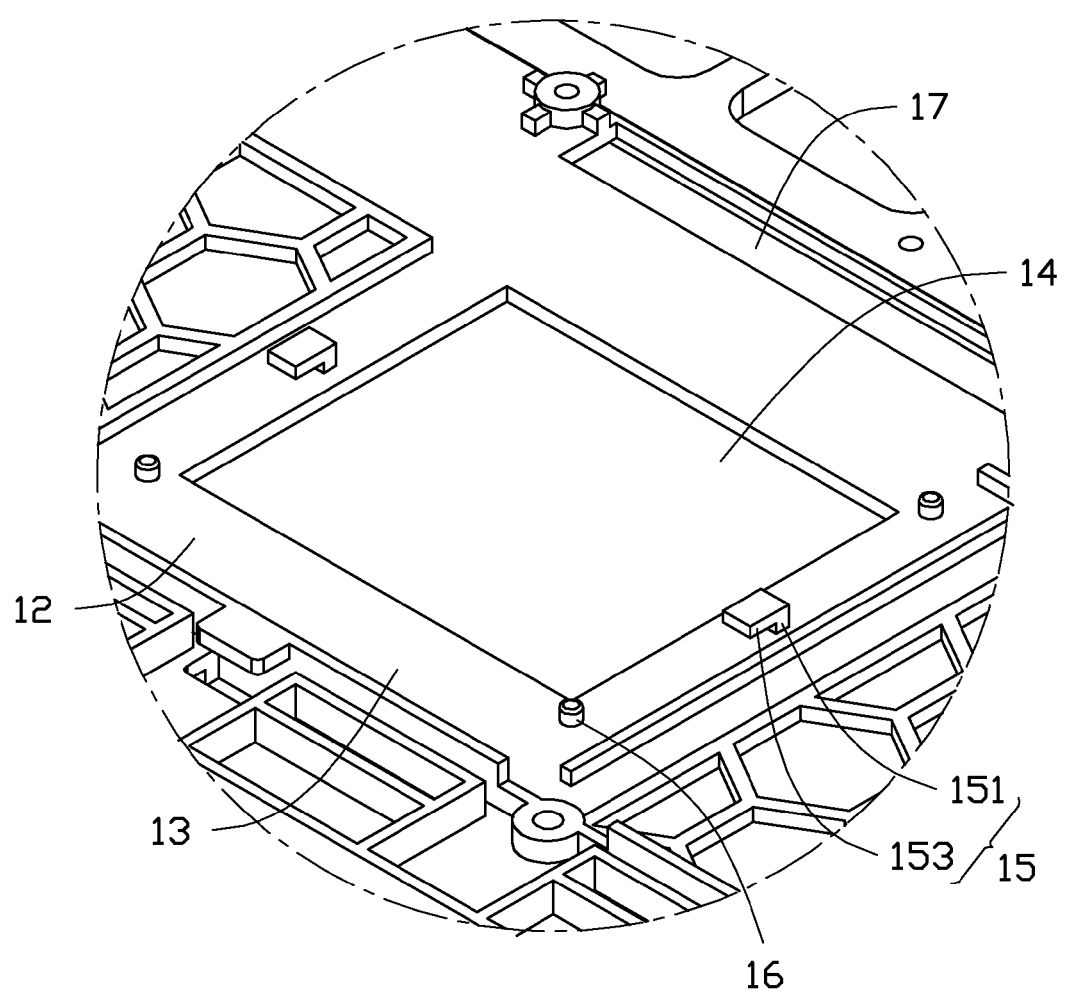
FIG. 2 is a partial, enlarged view of the portion II of FIG. 1.
Figure 3:
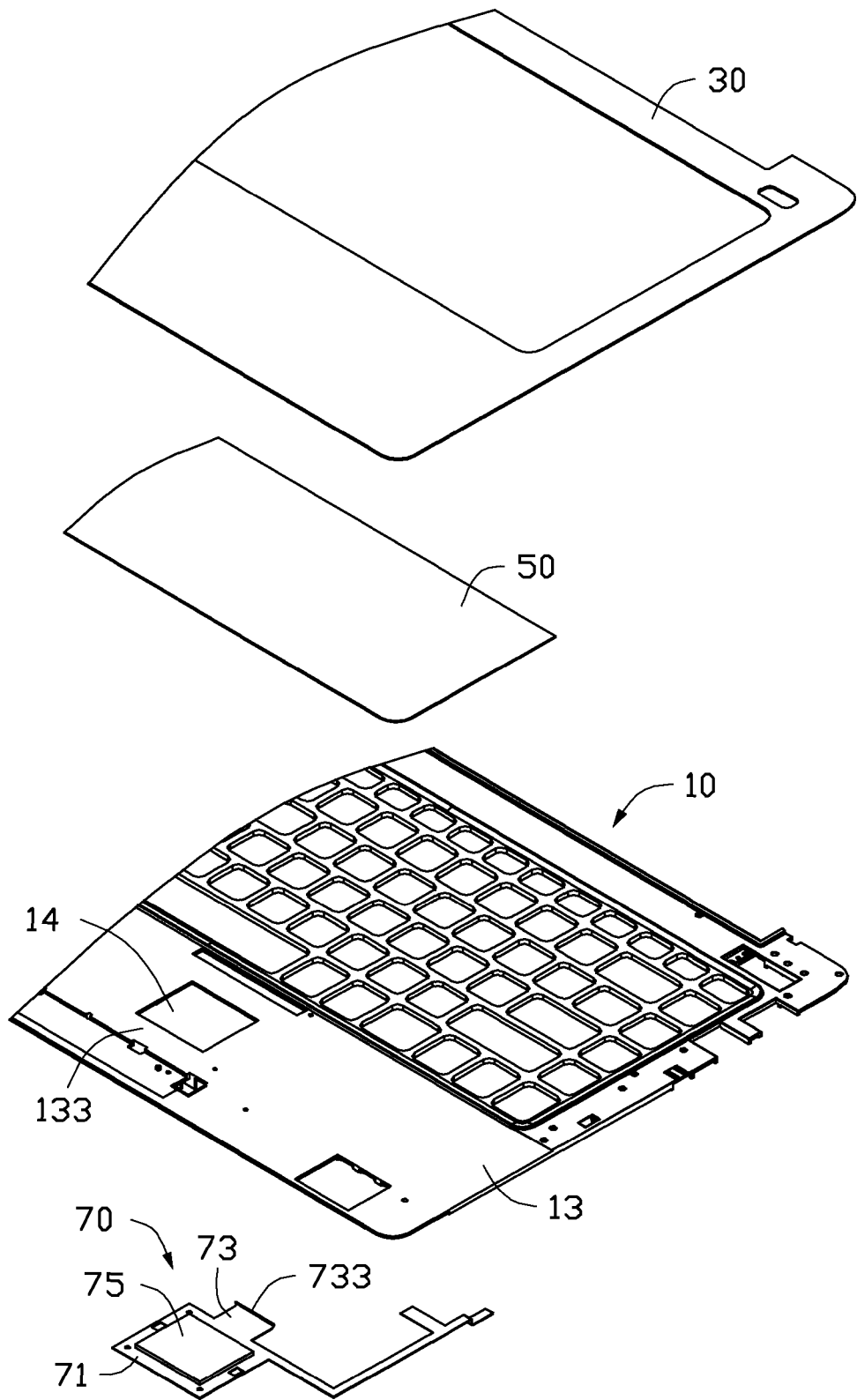
FIG. 3 is similar to FIG. 1, but viewed from another aspect.

FIGS. 1, 2, 3 show that a touch panel assembly includes an enclosure 10, an outer panel 30, a touch panel 50, and a soft board 70. The outer panel 30 is substantially parallel to the touch panel 50.

The enclosure 10 includes a positioning portion 12. The positioning portion 12 includes a bottom portion 13. The bottom portion 13 defines an opening 14. The bottom portion 13 defines a first surface 131 and a second surface 133 substantially parallel to the first surface 131. The positioning portion 12 further includes two hooks 15 extending from the first surface 131 and three positioning posts 16 extending from the first surface 131. The opening 14 is located between the two hooks 15. Each hook 15 includes a connecting portion 151 extending from the first surface 131 and an engaging portion 153 extending from the connecting portion 151. The hook 15 is L-shaped. The connecting portion 151 is substantially perpendicular to the bottom portion 13 and the engaging portion 153. The bottom portion 13 is substantially parallel to the touch panel 50. The enclosure 10 further defines a slot 17.

The soft board 70 includes a board body 71, a handling portion 73 extending from the board body 71, and a chip 75 extending from the board body 71. The chip 75 is configured to be received in the opening 14. The board body 71 defines two securing holes 711 corresponding to the two hooks 15, two first positioning holes 713 corresponding to the two positioning posts 16, and a second positioning hole 715. The securing hole 711 is square-shaped. The first positioning hole 713 and the second positioning hole 715 are circular. The handling portion 73 includes an extending portion 731 extending from the board body 71 and a resisting portion 733 extending from the extending portion 731. The resisting portion 733 is arc-shaped. The resisting portion 733 is configured to be placed in the slot 17. The board body 71 and the extending portion 731 are in the same plane and are substantially parallel to the bottom portion 13. The width of the board body 71 is greater than the width of the extending portion 731 in the direction substantially parallel to the bottom portion 13.

Figure 4:
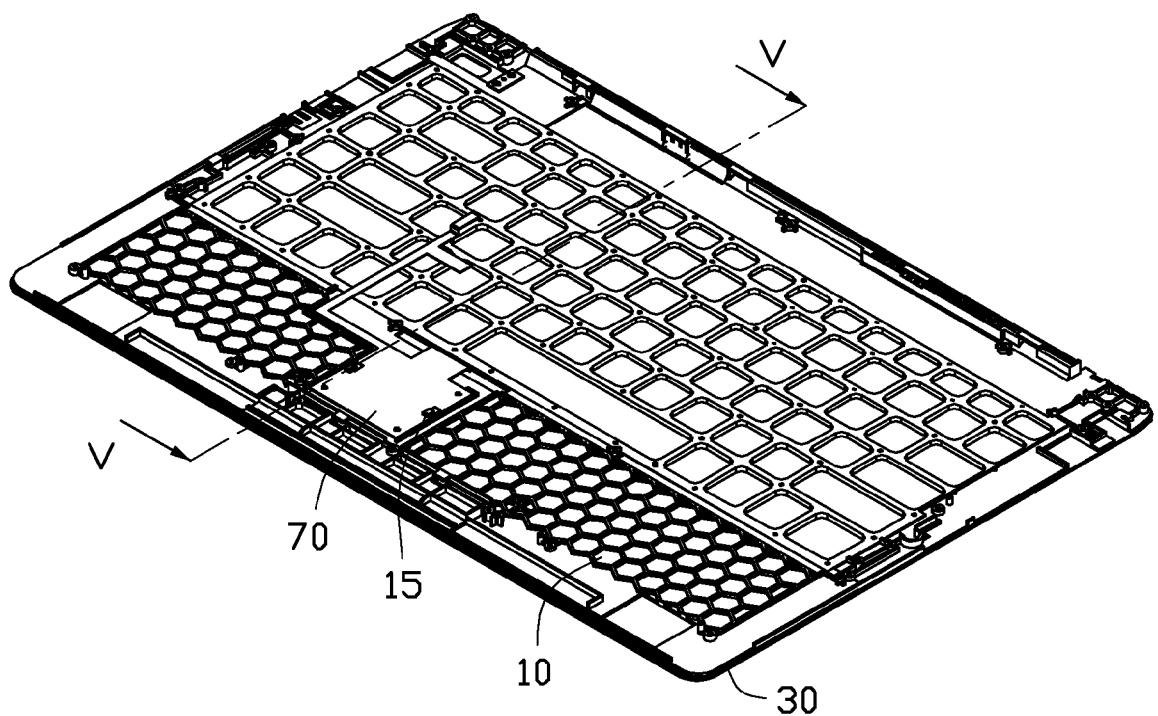
FIG. 4 is an assembled view of the touch panel assembly of FIG. 1.
Figure 5:
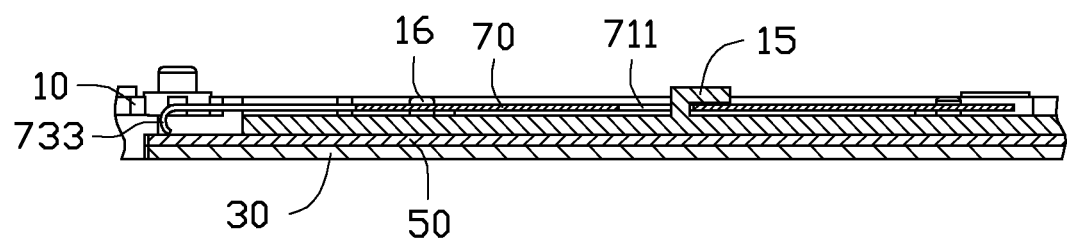
FIG. 5 is a cross-sectional view of the touch panel assembly of FIG. 4 taken along a line V-V.
Figure 6:
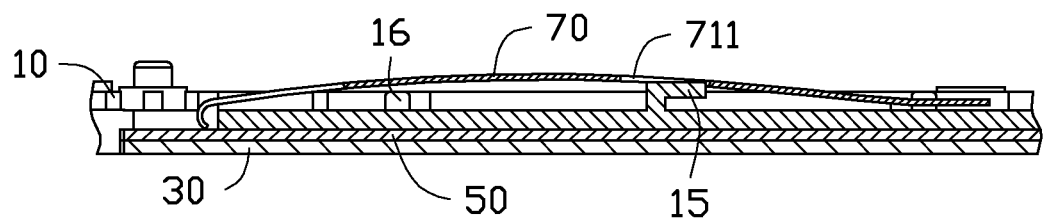
FIG. 6 is a cross-sectional view of FIG. 4 taken along a line V-V, the soft board is being dismounted.

FIGS. 4 to 6 show that in assembly, the touch panel 50 is placed on the second surface 133 of the bottom portion 13 of the positioning portion 12. The outer panel 30 is placed on the touch panel 50. The touch panel 50 and the outer panel 30 are glued together. The chip 75 of the soft board 70 is placed in the opening 14. The two first positioning holes 713 of the soft board 70 are aligned with two of the positioning posts 16. The soft board 70 moves close to the enclosure 10 to enable the two positioning posts 16 to pass through the two first positioning holes 713. The resisting portion 733 is driven by external force to enable the board body 71 to be deformed, thereby enabling the securing holes 711 of the soft board 70 to be aligned with the hooks 15 of the positioning portion 12. The board body 71 rebounds to drive the securing holes to receive the hooks 15. The connecting portion 151 of each hook 15 contacts the edge of the securing hole 711. The other positioning post 16 of the positioning portion 12 corresponds to the second positioning hole 715 of the soft board 70. The soft board 70 is pressed downward to enable the other positioning post 16 to pass through the second positioning hole 715. At this time, the resisting portion 733 passes through the slot 17 to contact the touch panel 50. The resisting portion 733 has golden fingers (not shown). The touch panel 50 also has golden fingers (not shown). The golden fingers of the resisting portion 733 contact the golden fingers of the touch panel 50 to be electronically connected together. The positioning posts 16 are received in the first positioning hole 713 and the second positioning hole 715, thereby preventing the soft board 70 from moving along a direction substantially parallel to the bottom portion 13. The hooks 15 engage with the edges of the securing holes 711 to prevent the soft board 70 from moving a direction substantially perpendicular to the bottom portion 13.

FIG. 5 shows that in disassembly, the resisting portion 733 is driven by external force to enable the board body 71 to be deformed, thereby enabling the securing holes 711 to disengage the hooks 15. And then the soft board 70 can be easily removed from the enclosure 10.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A touch panel assembly comprising:
an enclosure, the enclosure comprises a bottom portion; the bottom portion defines a first surface and a second surface; and the enclosure further comprises a first hook and a first positioning post extending from the first surface;

a touch panel configured to be attached to the second surface; and a soft board defines a first securing hole and a first positioning hole;

wherein the first positioning post is configured to be received in the first positioning hole to prevent the soft board from moving along a first direction; and the soft board is configured to be deformed by external force to enable the first hook to pass through the first securing hole to engage with an edge of the first securing hole, thereby preventing the soft board from moving in a second direction substantially perpendicular to the first direction.

2. The touch panel assembly of claim 1, wherein the soft board comprises a board body, an extending portion extending from the board body and a resisting portion extending from the extending portion; the resisting portion is configured to be deformed by external force to enable the first hook to pass through the first securing hole; and a width of the extending portion is less than a width of the board body along a third direction substantially perpendicular to the second direction.

3. The touch panel assembly of claim 2, wherein the resisting portion is arc-shaped.

4. The touch panel assembly of claim 2, wherein the soft board further comprises a chip mounted on the board body, and the bottom portion defines an opening receiving the chip.

5. The touch panel assembly of claim 2, wherein the bottom portion defines a slot receiving the resisting portion, and the resisting portion passes through the slot to be electronically connected to the touch panel.

6. The touch panel assembly of claim 1, wherein the soft board further defines a second securing hole; the enclosure further comprises a second hook extending from the first surface; the second hook is configured to engage with an edge of the second securing hole to prevent the soft board from moving along the second direction.

7. The touch panel assembly of claim 1, wherein the first hook comprises a connecting portion extending from the first surface and an engaging portion extending from the connecting portion, and the engaging portion is substantially parallel to the bottom portion.

8. The touch panel assembly of claim 1, wherein the bottom portion is substantially parallel to the first direction and is substantially perpendicular to the second direction.

9. The touch panel assembly of claim 1, wherein the enclosure further comprises a second positioning post extending from the first surface; the soft board further defines a second positioning hole configured to receive the second positioning post; and the first hook is located between the first positioning post and the second positioning post.

10. A touch panel assembly comprising:
an enclosure, the enclosure comprises a bottom portion; the bottom portion defines a first surface and a second surface; the enclosure further comprises a first hook and a first positioning post extending from the first surface; and the bottom portion defines a slot;

a touch panel, the touch panel is attached on the second surface; and a soft board, the soft board comprises a board body, an extending portion extending from the board body, and a resisting portion extending from the extending portion; the board body defines a first securing hole and a first positioning hole; and the resisting portion is received in the slot to electronically contact the touch panel;

wherein the first positioning post is received in the first positioning hole to prevent the soft board from moving along a first direction; the first hook engages with an edge of the first securing hole to prevent the soft board from moving a second direction substantially perpendicular to the first direction; and the board body is driven by external force to be deformed to enable the first securing hole to disengage the first hook.

11. The touch panel assembly of claim 10, wherein a width of the extending portion is less than a width of board body along a third direction substantially perpendicular to the second direction.

12. The touch panel assembly of claim 10, wherein the resisting portion is arc-shaped.

13. The touch panel assembly of claim 10, wherein the soft board further comprises a chip mounted on the board body, and the bottom portion defines an opening receiving the chip.

14. The touch panel assembly of claim 10, wherein the soft board further defines a second securing hole; the enclosure further comprises a second hook extending from the first surface; the second hook engages with an edge of the second securing hole to prevent the soft board from moving along the second direction.

15. The touch panel assembly of claim 10, wherein the first hook comprises a connecting portion extending from the first surface and an engaging portion extending from the connecting portion, and the engaging portion is substantially parallel to the bottom portion.

16. The touch panel assembly of claim 10, wherein the bottom portion is substantially parallel to the first direction and is substantially perpendicular to the second direction.

17. The touch panel assembly of claim 10, wherein the enclosure further comprises a second positioning post extending from the first surface; the soft board further defines a second positioning hole configured to receive the second positioning post; and the first hook is located between the first positioning post and the second positioning post.

* * * * *